US011709064B2

(12) United States Patent
Cha (10) Patent No.: US 11,709,064 B2
(45) Date of Patent: Jul. 25, 2023

(54) DEVICE AND METHOD FOR DISPLAYING A DISTANCE TO EMPTY OF AN ELECTRIC VEHICLE

(71) Applicants: Hyundai Motor Company, Seoul (KR); Kia Motors Corporation, Seoul (KR)

(72) Inventor: Jung Min Cha, Hwaseong-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 246 days.

(21) Appl. No.: 16/794,763

(22) Filed: Feb. 19, 2020

(65) Prior Publication Data

US 2021/0123756 A1 Apr. 29, 2021

(30) Foreign Application Priority Data

Oct. 23, 2019 (KR) .................. 10-2019-0132411

(51) Int. Cl.
*G01C 21/34* (2006.01)
*B60L 58/24* (2019.01)

(52) U.S. Cl.
CPC .......... *G01C 21/3469* (2013.01); *B60L 58/24* (2019.02); *G01C 21/3492* (2013.01)

(58) Field of Classification Search
CPC ............ B60L 2260/52; B60L 2250/16; G01C 21/3492; G01C 21/3469
See application file for complete search history.

(56) References Cited

U.S. PATENT DOCUMENTS

| 10,612,933 | B1* | 4/2020 | Ledet ................ G01C 21/3469 |
| 2013/0079962 | A1* | 3/2013 | Ishikawa ............ B60L 15/2045 701/22 |
| 2013/0311016 | A1* | 11/2013 | Kim ...................... G07C 5/08 180/65.265 |
| 2014/0005879 | A1* | 1/2014 | Poechmueller ...... G01G 19/086 701/29.1 |
| 2016/0061610 | A1* | 3/2016 | Meyer ..................... B60L 58/12 701/22 |
| 2016/0097652 | A1* | 4/2016 | Liu .................... G01C 21/3469 701/423 |
| 2016/0129918 | A1* | 5/2016 | Skaff ..................... B60W 50/14 340/455 |

(Continued)

FOREIGN PATENT DOCUMENTS

| JP | 2011188578 A | 9/2011 |
| JP | 2018019483 A | 2/2018 |
| JP | 2018064329 A | 4/2018 |

OTHER PUBLICATIONS

Goodyear, Factors Affecting Truck Fuel Economy, 2008 (Year: 2008).*

(Continued)

*Primary Examiner* — Khoi H Tran
*Assistant Examiner* — Tristan J Greiner
(74) *Attorney, Agent, or Firm* — Slater Matsil, LLP (57) ABSTRACT

A device for displaying a distance to empty of an electric vehicle is provided. The device includes a detector configured to detect state information of the vehicle and a controller configured to estimate a weight of the vehicle based on the state information of the vehicle and determine whether to update the distance to empty based on the estimated weight.

18 Claims, 7 Drawing Sheets

(56) References Cited

U.S. PATENT DOCUMENTS

2017/0259697 A1* 9/2017 Dastoor .................... B60L 1/00
2018/0029500 A1* 2/2018 Katanoda ........... G01C 21/3697

OTHER PUBLICATIONS

John Taggart, "Ambient Temperature Impacton Real-World Electric Vehicle Efficiency & Range", 2017, IEEE Transportation Electrification Conference and Expo. (Year: 2017).*

* cited by examiner

DEVICE AND METHOD FOR DISPLAYING A DISTANCE TO EMPTY OF AN ELECTRIC VEHICLE

CROSS-REFERENCE TO RELATED APPLICATION

This application claims priority to Korean Patent Application No. 10-2019-0132411, filed in the Korean Intellectual Property Office on Oct. 23, 2019, which application is hereby incorporated herein by reference.

TECHNICAL FIELD

The present disclosure relates to a device and a method for displaying a distance to empty of an electric vehicle.

BACKGROUND

It is important for an electric vehicle to identify a battery state about a current battery temperature, a battery SOC (State Of Charge), or the like, and to manage the battery state to be maintained at a certain level or above. This is to identify the battery SOC in real time and provide a driver a distance to empty based on the SOC of the battery while traveling.

In general, the distance to empty is calculated using a relationship between the SOC (%), which is the remaining energy of a high voltage battery, and an energy consumption rate per distance of the vehicle. In a case of an electric vehicle capable of loading cargo or attaching a towing trailer, a weight of the vehicle is greatly increased, and thus, a traveling resistance is increased. Thus, the energy consumption rate per distance of the vehicle increases, so that an accuracy of distance to empty prediction decreases.

SUMMARY

The present disclosure has been made to solve the above-mentioned problems occurring in the prior art while advantages achieved by the prior art are maintained intact.

An embodiment of the present disclosure provides a device and a method for displaying a distance to empty of an electric vehicle based on a weight that may estimate a weight of the vehicle and update the distance to empty by reflecting the estimated weight.

The technical problems to be solved by embodiments of the present disclosure are not limited to the aforementioned problems, and any other technical problems not mentioned herein will be clearly understood from the following description by those skilled in the art to which the present disclosure pertains.

According to an aspect of the present disclosure, a device for displaying a distance to empty of an electric vehicle includes a detector configured to detect state information of the vehicle, and a controller that estimates a weight of the vehicle based on the state information of the vehicle, and determines whether to update the distance to empty based on the estimated weight.

In one embodiment, the controller may determine to update the distance to empty when the estimated weight is increased or decreased more than a reference value from a preset weight.

In one embodiment, the update of the distance to empty may include calculation of a vehicle-driving related electric-efficiency based on the estimated weight, calculation of a vehicle-driving unrelated electric-efficiency, and calculation of the distance to empty based on the calculated vehicle-driving related electric-efficiency and the calculated vehicle-driving unrelated electric-efficiency.

In one embodiment, the vehicle-driving related electric-efficiency may include a rate of a vehicle travel distance per unit electric quantity calculated during traveling of the vehicle.

In one embodiment, the vehicle-driving related electric-efficiency calculated based on the estimated weight may be calculated by selecting a vehicle-driving related electric-efficiency corresponding to the estimated weight from previously stored vehicle-driving related electric-efficiencies, and reflecting an external temperature to the selected vehicle-driving related electric-efficiency.

In one embodiment, the previously stored vehicle-driving related electric-efficiencies may include a rate of a vehicle travel distance per unit electricity quantity calculated based on an actually measured weight of the vehicle.

In one embodiment, the vehicle-driving unrelated electric-efficiency may include a rate of a vehicle travel distance per unit electric quantity calculated based on use of a full automated temperature controller and road information.

In one embodiment, the road information may include a gradient of a road and a speed limit set on the road.

In one embodiment, the controller may control to guide the performing of the update when it is determined to perform the distance to empty update.

In one embodiment, the controller may calculate the vehicle-driving related electric-efficiency by reflecting an external temperature to the selected vehicle-driving related electric-efficiency.

According to another aspect of the present disclosure, a method for displaying a distance to empty of an electric vehicle includes detecting state information of the vehicle, estimating a weight of the vehicle based on the state information of the vehicle, and determining whether to update the distance to empty based on the estimated weight.

In one embodiment, the method may further include determining to update the distance to empty when the estimated weight is increased or decreased more than a reference value from a preset weight.

In one embodiment, the update of the distance to empty may include calculating a vehicle-driving related electric-efficiency based on the estimated weight, calculating a vehicle-driving unrelated electric-efficiency, and calculating the distance to empty based on the calculated vehicle-driving related electric-efficiency and the calculated vehicle-driving unrelated electric-efficiency.

In one embodiment, the vehicle-driving related electric-efficiency may include a rate of a vehicle travel distance per unit electric quantity calculated during traveling of the vehicle.

In one embodiment, the calculating of the vehicle-driving related electric-efficiency based on the estimated weight may include selecting a vehicle-driving related electric-efficiency corresponding to the estimated weight from previously stored vehicle-driving related electric-efficiencies, and reflecting an external temperature to the selected vehicle-driving related electric-efficiency to calculate the vehicle-driving related electric-efficiency.

In one embodiment, the previously stored vehicle-driving related electric-efficiencies may include a rate of a vehicle travel distance per unit electricity quantity calculated based on an actually measured weight of the vehicle.

In one embodiment, the vehicle-driving unrelated electric-efficiency may include a rate of a vehicle travel distance per unit electric quantity calculated based on use of a full automated temperature controller and road information.

In one embodiment, the road information may include a gradient of a road and a speed limit set on the road.

In one embodiment, the method may further include guiding the performing of the update when it is determined to perform the distance to empty update.

In one embodiment, the method may further include calculating the vehicle-driving related electric-efficiency by reflecting an external temperature to the selected vehicle-driving related electric-efficiency.

BRIEF DESCRIPTION OF THE DRAWINGS

The above and other objects, features and advantages of the present disclosure will be more apparent from the following detailed description taken in conjunction with the accompanying drawings in which.

DETAILED DESCRIPTION OF ILLUSTRATIVE EMBODIMENTS

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing embodiments of the present disclosure, a detailed description of well-known features or functions will be omitted in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 1:
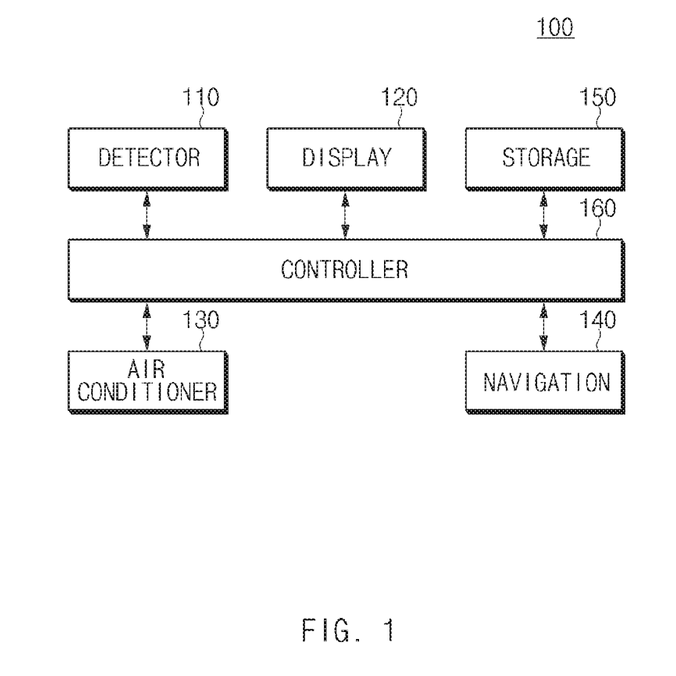
FIG. 1 is a diagram illustrating a configuration of a device for displaying a distance to empty of an electric vehicle according to one embodiment of the present disclosure.

FIG. 1 is a diagram illustrating a configuration of a device for displaying a distance to empty of an electric vehicle according to one embodiment of the present disclosure.

As shown in FIG. 1, a display device 100 of a distance to empty of an electric vehicle according to an embodiment of the present disclosure may include a detector no, a display 120, an air conditioner 130, a navigation 140, storage 150, and a controller 160.

The detector no detects a state of the vehicle. To this end, the detector no may include a plurality of sensors. In one example, the plurality of sensors may include an accelerator pedal position sensor (APS), a brake pedal position sensor (BPS), a pressure sensor, a temperature sensor, a motor rotation speed sensor, an air flow sensor (AFS), an intake air temperature sensor (ATS), a water temperature sensor (WTS), a crank angle sensor (CAS), a speed sensor, a tilt sensor, a battery sensor, an acceleration sensor, a tire sensor, and the like. To this end, the detector no may detect at least one of an acceleration, a motor torque, a tire dynamic radius, a vehicle speed, and/or a driving load of the vehicle.

The display 120 may display an updated distance to empty or may guide a changed vehicle-driving related electric-efficiency in response to a control signal of the controller 160. According to an embodiment, the display 120 may be disposed on a vehicle instrument panel, a dashboard, a center fascia, a console box, or the like. The display 120 may be implemented as a display employing a liquid crystal display (LCD) panel, a light emitting diode (LED) panel, an organic light emitting diode (OLED) panel, a plasma display panel (PDP), or the like. The liquid crystal display may include a thin film transistor-LCD (TFT-LCD). The display 120 may be integrally implemented by a touch screen panel (TSP).

The air conditioner 130 may include a full automatic temperature controller (FATC), and may control a motor using a set program to maintain an indoor temperature of the vehicle at a temperature set by a driver in response to input signals from a plurality of sensors (internal and external temperature sensors, a water temperature sensor, and a solar heat sensor) and an input unit (not shown). To this end, the air conditioner 130 may include a cooling apparatus (air conditioner) and/or a heating apparatus (PTC: Positive Temperature Coefficient).

The navigation 140 may include a display that displays a map or various information related to a map, such as information about a road on which the vehicle travels or a traveling route to a destination the driver wants to reach, and a speaker for outputting sound in response to a manipulation command of the driver. In this connection, the information about the road may include a gradient of the road, a speed limit of the road, and the like. According to an embodiment, the navigation 140 may be disposed on a center fascia, and the navigation 140 may include an input unit for receiving the manipulation command of a driver. The input unit may perform not only a manipulation of rotating or applying pressure, but also a manipulation of handwriting using a user's finger or a tool having a separate touch recognition function by including a touch pad having a touch recognition function.

The storage 150 may store a vehicle-driving related electric-efficiency calculated during a previous travel, and when a weight change is estimated and the previously stored vehicle-driving related electric-efficiency is changed, store the changed vehicle-driving related electric-efficiency. In addition, the storage 150 may store a vehicle-driving related electric-efficiency calculated by reflecting an external temperature based on an actually measured weight of the vehicle to calculate the vehicle-driving related electric-efficiency by reflecting the changed weight. The storage 150 may include at least one storage medium of a flash memory, a hard disk, a memory card, a read-only memory (ROM), a random access memory (RAM), an electrically erasable programmable read-only memory (EEPROM), a programmable read-only memory (PROM), a magnetic memory, a magnetic disk, and an optical disk.

The controller 160 may be implemented by various processing devices, such as a microprocessor in which a semiconductor chip capable of performing calculations or executions of various commands, and may control overall operations of the display device of the distance to empty of the electric vehicle according to an embodiment of the present disclosure. Specifically, the controller 160 may estimate a weight of the vehicle based on a state of the vehicle, and determine whether to update the distance to empty based on the estimated weight. The present disclosure will be described as being divided into a plurality of configurations for respective operations to describe operations of the controller 160 in detail. A more detailed description will be achieved with reference to FIG. 2.

Figure 2:
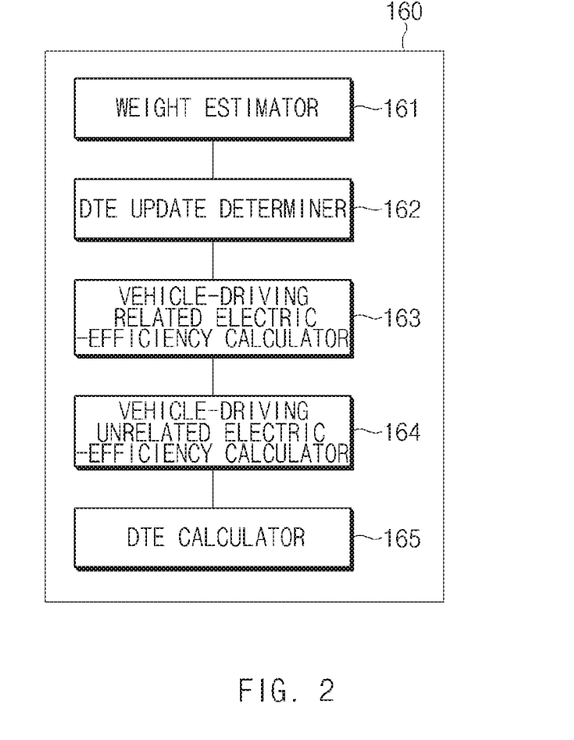
FIG. 2 is a diagram illustrating a configuration of a controller according to one embodiment of the present disclosure.

FIG. 2 is a diagram illustrating a configuration of a controller according to one embodiment of the present disclosure.

As shown in FIG. 2, the controller 160 may include a weight estimator 161, a DTE update determiner 162, a vehicle-driving related electric-efficiency calculator 163, a vehicle-driving unrelated electric-efficiency calculator 164, and a DTE calculator 165.

According to an embodiment, the weight estimator 161 may determine whether to estimate the weight based on at least one of an accelerator pedal position value and/or a brake pedal position value. Then, when it is determined to estimate the weight, the weight estimator 161 determines the weight of the vehicle based on state information of the vehicle detected from the detector no. According to an embodiment, the weight estimator 161 may estimate the weight of the vehicle using Equation 1.

$$m = \frac{\int_{t0}^{t1} \left[\frac{\eta_{RD}}{r_{tire}}\left(\tau_{Mot}^{BeAj}\right) - (f_0 + f_1 v + f_2 v^2)\right] dt}{\left[\Delta v + \int_{t0}^{t1} g \sin\theta dt\right]} \quad \text{[Equation 1]}$$

In addition, the weight estimator 161 may determine whether an estimated weight is increased or decreased more than a reference value from a preset weight. As an example, when an estimated weight is 2750 kg for a truck with a preset weight of 2000 kg, and when a reference value of weight increase or decrease is set to 500 kg, the weight estimator 161 may determine that the estimated weight is increased more than the reference value from the preset weight. When determining that the estimated weight is increased or decreased more than the reference value from the preset weight, the weight estimator 161 may inform that the estimated weight is increased or decreased from the preset weight through the display 120.

The DTE update determiner 162 may determine whether to update the distance to empty (DTE) based on the weight estimated by the weight estimator 161. For example, when it is determined that the weight estimated by the weight estimator 161 is increased or decreased more than the reference value from the preset weight, the DTE update determiner 162 may determine that the DTE update should be performed. When determining that the DTE update should be performed, the DTE update determiner 162 may control the display 120 to guide the DTE update.

When the DTE update determiner 162 determines that the DTE update should be performed, the vehicle-driving related electric-efficiency calculator 163 may calculate the vehicle-driving related electric-efficiency by reflecting the increased or decreased weight. In this connection, the vehicle-driving related electric-efficiency may include a ratio of the vehicle distance to empty per unit electricity calculated during driving of the vehicle.

According to the embodiment, the vehicle-driving related electric-efficiency calculator 163 may calculate the vehicle-driving related electric-efficiency based on a weight of the vehicle set in a previous traveling cycle. As an example, the vehicle-driving related electric-efficiency calculator 163 may select a vehicle-driving related electric-efficiency corresponding to the weight of the vehicle measured or estimated in the previous cycle from the previously stored vehicle-driving related electric-efficiencies, and reflect the external temperature of the vehicle to the selected vehicle-driving related electric-efficiency to calculate the vehicle-driving related electric-efficiency. In this connection, the previously stored vehicle-driving related electric-efficiencies may include the vehicle-driving related electric-efficiency calculated based on the actually measured weight of the vehicle.

In addition, the vehicle-driving related electric-efficiency calculator 163 may select a vehicle-driving related electric-efficiency corresponding to a weight estimated in a current traveling cycle from the previously stored vehicle-driving related electric-efficiencies, and reflect the external temperature to the selected vehicle-driving related electric-efficiency to calculate the vehicle-driving related electric-efficiency. Specifically, the vehicle-driving related electric-efficiency calculator 163 may calculate the vehicle-driving related electric-efficiency by multiplying a temperature correction coefficient corresponding to the external temperature by the selected vehicle-driving related electric-efficiency. For example, when the external temperature is below a first temperature (preset temperature) and above a second temperature (preset temperature), the vehicle-driving related electric-efficiency calculator 163 may calculate the vehicle-driving related electric-efficiency by reflecting the external temperature.

As an example, when it is assumed that the weight of the vehicle estimated by the weight estimator 161 is 2750 kg and the external temperature is 15 degrees, the vehicle-driving related electric-efficiency calculator 163 may calculate the vehicle-driving related electric-efficiency as a product of the vehicle-driving related electric-efficiency of 3.3 km/kwh calculated based on the actually measured vehicle weight of 2750 kg, and the temperature correction coefficient of 0.95, that is, 3.135 km/kwh. When calculating the vehicle-driving related electric-efficiency by reflecting the estimated weight, the vehicle-driving related electric-efficiency calculator 163 may store a calculation result value in the storage 150.

The vehicle-driving unrelated electric-efficiency calculator 164 may calculate a vehicle-driving unrelated electric-efficiency. According to the embodiment of the present disclosure, the vehicle-driving unrelated electric-efficiency calculator 164 may calculate an electric-efficiency of an electronic device inside the vehicle and an electric-efficiency based on road information. In this connection, the electronic device inside the vehicle may include a full automated temperature controller (FATC) in the vehicle, and the vehicle-driving unrelated electric-efficiency calculator 164 may calculate a vehicle distance to empty per unit electricity when using the full automated temperature controller inside the vehicle. For example, the vehicle-driving unrelated electric-efficiency calculator 164 may calculate the electric-efficiency of the electronic device inside the vehicle using Calculation Formula 1.

electric-efficiency of electronic device inside vehicle=traveled distance after charging/(power used by aircon compressor after charging+accumulated power used by positive temperature coefficient (PTC) after charging) <Calculation Formula 1>

For example, when the traveled distance after the charging is 100 km, and the power used by the full automated temperature controller (Aircon Compressor and PTC) is 1000 kwh, the vehicle-driving unrelated electric-efficiency calculator 164 may calculate the electric-efficiency of the electronic device inside the vehicle as 0.1 km/kwh by calculating 100 km/woo kwh using Calculation Formula 1.

In addition, the vehicle-driving unrelated electric-efficiency calculator 164 may calculate the electric-efficiency based on the road information of the traveling route set by the navigation 140. In this connection, the road information may include a gradient of the road and a speed limit set on the road. The vehicle-driving unrelated electric-efficiency calculator 164 may calculate an electric-efficiency resulted from the road gradient based on the electric-efficiency when traveling in the traveling route and the information of the road gradient existing on the traveling route.

The distance to empty (DTE) calculator 165 may calculate the distance to empty using an available energy of a battery received from a battery management system (BMS), and the electric-efficiency calculated by the electric-efficiency calculator 163 and the vehicle-driving unrelated electric-efficiency calculator 164. As an example, the distance to empty calculator 165 may calculate the distance to empty using Calculation Formula 2.

distance to empty (DTE)=(available energy of battery (Kwh)*vehicle-driving related electric-efficiency (km/Kwh))−(available energy of battery (Kwh)*vehicle-driving unrelated electric-efficiency (km/Kwh)). <Calculation Formula 2>

For example, the available energy of the battery is 60 kwh, the weight set before the vehicle weight estimation is 2000 kg, the preset vehicle-driving related electric-efficiency is 4.3 km/kwh, and the vehicle-driving unrelated electric-efficiency is 0.1 km/kwh, the DTE calculator 165 may calculate the distance to empty as 252 km using Calculation Formula 2 (60*4.3)−(60*0.1)=258 km−6 km=252 km.

Further, when the available energy of the battery is 60 kwh, the vehicle weight estimated by the weight estimator 161 is 2750 kg, the vehicle-driving related electric-efficiency calculated by the vehicle-driving related electric-efficiency calculator 163 by reflecting the estimated weight is 3.135 km/kwh, and the vehicle-driving unrelated electric-efficiency is 0.1 km/kwh, the DTE calculator 165 may calculate the distance to empty as 182 km using Calculation Formula 2 (60*3.135)−(60*0.1)=188 km−6 km=182 km.

When calculating the distance to empty using Calculation Formula 2, the DTE calculator 165 may be controlled to output the calculated distance to empty through the display 120. According to an embodiment, the DTE calculator 165 may be controlled to display the distance to empty calculated based on the preset weight before the weight estimation, and to display a message guiding the DTE update through the display 120 when the weight estimator 161 determines that the weight change amount exceeds the reference value, and thus the DTE update determiner 162 determines that the DTE update should be performed. In addition, the DTE calculator 165 may be controlled to display the distance to empty calculated by reflecting the estimated weight after the DTE update guiding message is output.

Figure 3:
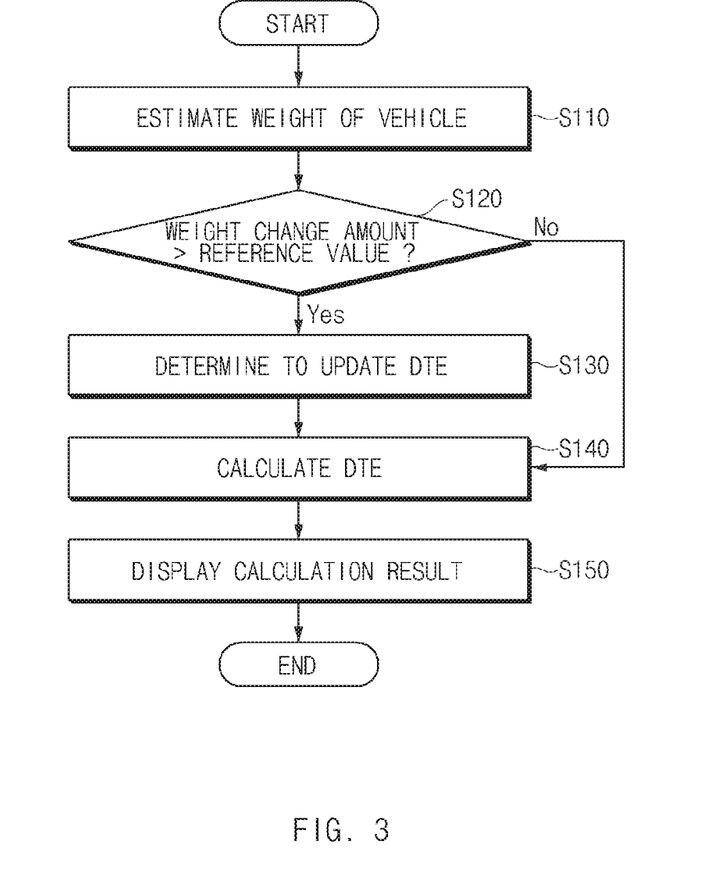
FIG. 3 is a flowchart illustrating a method for displaying a distance to empty of an electric vehicle according to one embodiment of the present disclosure.

FIG. 3 is a flowchart illustrating a method for displaying a distance to empty of an electric vehicle according to one embodiment of the present disclosure.

As shown in FIG. 3, the weight estimator 161 of the present disclosure estimates the weight of the vehicle (S110). In S110, the weight estimator 161 may determine whether to estimate the weight based on at least one of the accelerator pedal position value and/or the brake pedal position value. When it is determined in S110 that the weight estimator is to estimate the weight, the weight of the vehicle may be estimated based on the state information of the vehicle detected from the detector no. According to an embodiment, the weight of the vehicle may be estimated using Equation 1.

The weight estimator 161 calculates the weight change amount of how much the weight of the vehicle estimated in S110 is increased or decreased from the preset weight, and determines whether the weight change amount exceeds the reference value (S120). When it is determined in S120 that the weight change amount exceeds the reference value, the weight estimator 161 may guide that the estimated weight is increased or decreased through the display 120.

When it is determined in S120 that the weight change amount exceeds the reference value, the DTE update determiner 162 may determine that the DTE update should be performed (S130). When determining that the DTE update should be performed in S130, the DTE update determiner 162 may control the display 120 to guide the DTE update.

When the DTE update determiner 162 determines that the DTE update should be performed, the DTE calculator 165 may update the pre-calculated DTE by calculating the distance to empty reflecting the estimated weight (S140). In S140, the DTE calculator 165 may calculate the distance to empty using Calculation Formula 2. A more detailed description of S140 will be achieved with reference to FIG. 4.

When calculating the distance to empty reflecting the estimated weight, the DTE calculator 165 displays the distance to empty calculated as a result of the calculation (S150). In S150, the DTE calculator 165 may display the distance to empty calculated based on the preset weight before the weight estimation, and display the distance to empty calculated based on the estimated weight after the DTE update determiner 162 guides the DTE update.

Figure 4:
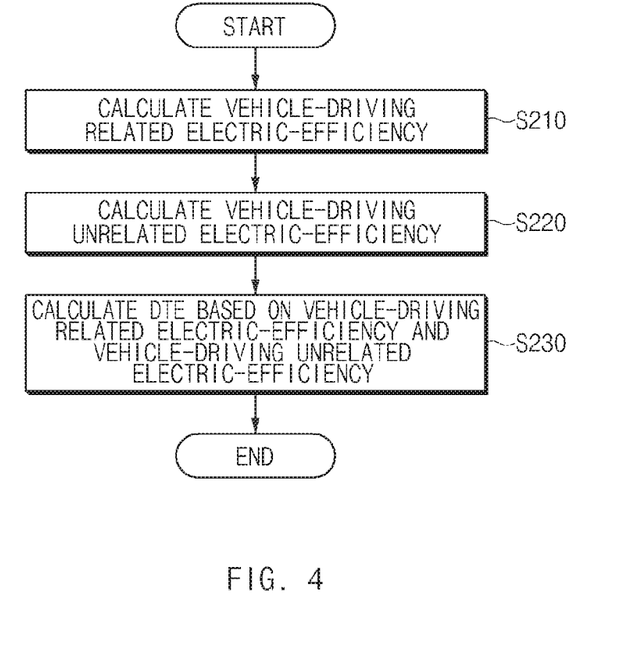
FIG. 4 is a flowchart illustrating a method for calculating a DTE according to one embodiment of the present disclosure.

FIG. 4 is a flowchart illustrating a method for calculating a DTE according to one embodiment of the present disclosure.

As shown in FIG. 4, the vehicle-driving related electric-efficiency calculator 163 calculates the vehicle-driving related electric-efficiency for calculating the distance to empty of the DTE calculator 165 (S210). In S210, the vehicle-driving related electric-efficiency calculator 163 may calculate the vehicle-driving related electric-efficiency calculated based on the weight set in the previous traveling cycle, or may calculate the vehicle-driving related electric-efficiency based on the weight estimated in the current traveling cycle. A detailed description thereof will be achieved with reference to FIG. 5.

The vehicle-driving unrelated electric-efficiency calculator 164 calculates the vehicle-driving unrelated electric-efficiency for the calculation of the distance to empty by the DTE calculator 165 (S220). In S220, the electronic device inside the vehicle may include the full automated temperature controller (FATC) inside the vehicle, and the vehicle-driving unrelated electric-efficiency calculator 164 may calculate the vehicle distance to empty per unit electricity when using the full automated temperature controller inside the vehicle. For example, the vehicle-driving unrelated electric-efficiency calculator 164 may calculate the electric-efficiency of the electronic device inside the vehicle using Calculation Formula 1. In S220, the vehicle-driving unrelated electric-efficiency calculator 164 may calculate the electric-efficiency based on the road information of the traveling route set by the navigation 140.

The DTE calculator 165 may calculate the distance to empty based on the available energy of the battery received from the battery management system and the vehicle-driving related electric-efficiency and the vehicle-driving unrelated electric-efficiency calculated in S210 and S220. As an example, the DTE calculator 165 may calculate the distance to empty using Calculation Formula 2.

Figure 5:
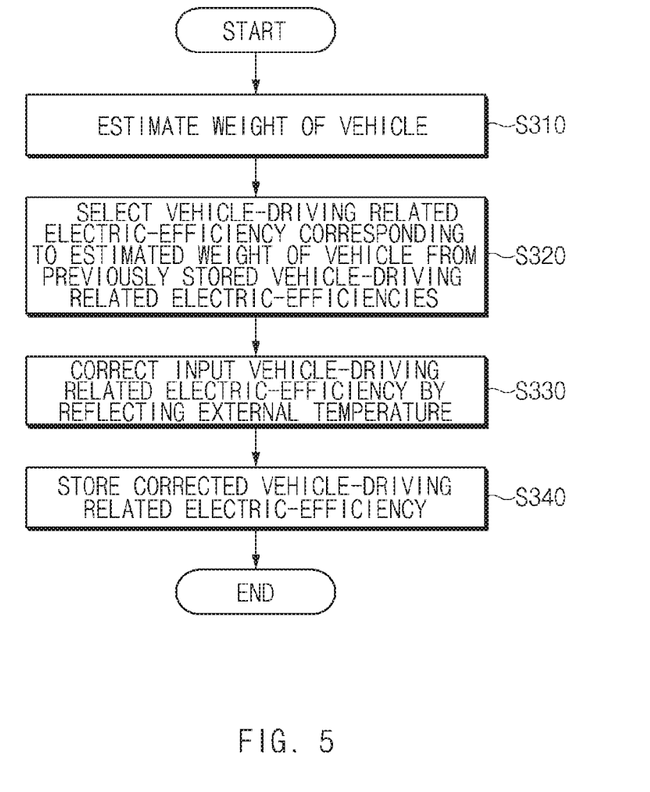
FIG. 5 is a flowchart illustrating a method for calculating a vehicle-driving related electric-efficiency according to one embodiment of the present disclosure.

FIG. 5 is a flowchart illustrating a method for calculating a vehicle-driving related electric-efficiency according to one embodiment of the present disclosure.

As shown in FIG. 5, the weight estimator 161 estimates the weight of the vehicle (S310). In S310, the weight estimator 161 may determine whether the estimated weight is increased or decreased more than the reference value from the preset weight.

The vehicle-driving related electric-efficiency calculator 163 calculates the vehicle-driving related electric-efficiency by reflecting the increased or decreased weight (S320). In S320, the vehicle-driving related electric-efficiency calculator 163 may select the vehicle-driving related electric-efficiency corresponding to the weight of the vehicle measured or estimated in the previous traveling cycle from the previously stored vehicle-driving related electric-efficiencies. Further, in S320, the vehicle-driving related electric-efficiency calculator 163 may select the vehicle-driving related electric-efficiency corresponding to the weight of the vehicle estimated in the current traveling cycle from the previously stored vehicle-driving related electric-efficiencies.

The vehicle-driving related electric-efficiency calculator 163 may calculate the vehicle-driving related electric-efficiency by reflecting the external temperature to the vehicle-driving related electric-efficiency selected in S320 (S330). In S330, the vehicle-driving related electric-efficiency calculator 163 may calculate the vehicle-driving related electric-efficiency by multiplying the temperature correction coefficient corresponding to the external temperature to the selected vehicle-driving related electric-efficiency.

When the vehicle-driving related electric-efficiency is calculated, the vehicle-driving related electric-efficiency calculator 163 may store the calculated vehicle-driving related electric-efficiency in the storage 150 (S340).

Figure 6:
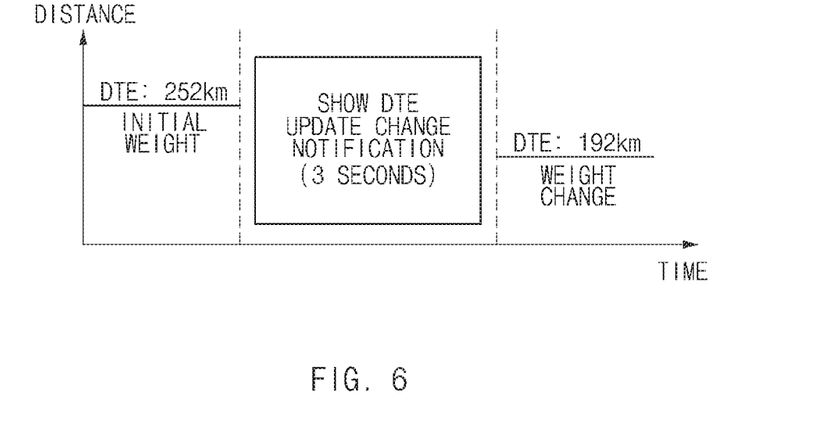
FIG. 6 is a diagram illustrating a method for guiding a change in a distance to empty according to one embodiment of the present disclosure.

FIG. 6 is a diagram illustrating a scheme for guiding a distance to empty according to one embodiment of the present disclosure.

When calculating the distance to empty, the DTE calculator 165 displays the distance to empty calculated as the result of the calculation. For example, as shown in FIG. 6, the DTE calculator 165 may display the distance to empty calculated based on the preset weight before the weight estimation. As an example, when calculating the distance to empty calculated based on the preset weight before the weight estimation as 252 km, the DTE calculator 165 may display the calculated distance to empty of 252 km. Then, when determining that the DTE update should be performed, the DTE update determiner 162 may output the message guiding the DTE update. Then, the DTE calculator 165 may display the distance to empty calculated based on the estimated weight. As an example, when calculating the distance to empty calculated based on the estimated weight as 192 km, the DTE calculator 165 may display the calculated distance to empty of 192 km.

Therefore, the device and the method for displaying the distance to empty of the electric vehicle of the present disclosure may guide the driver whether to update the DTE through the display, and also provide the distance to empty changed based on the DTE update, so that the driver may prepare for a situation in which traveling is impossible.

Figure 7:
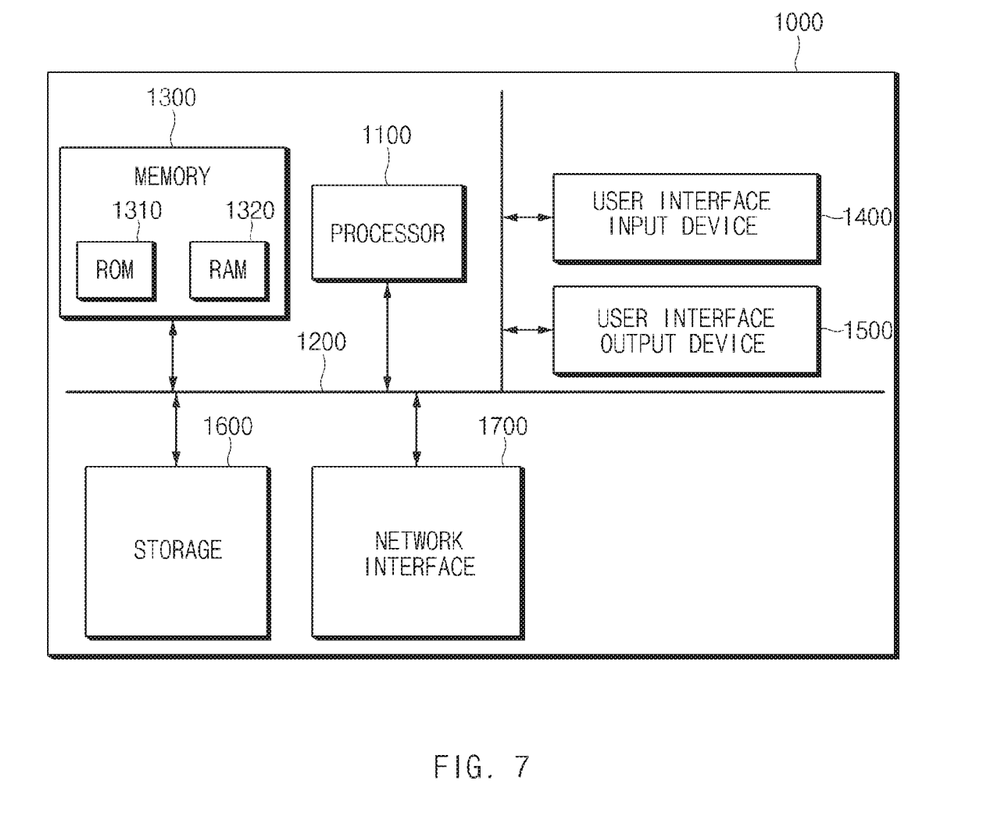
FIG. 7 illustrates a computing system in which a method according to an embodiment of the present disclosure is implemented.

FIG. 7 illustrates a computing system in which a method according to an embodiment of the present disclosure is implemented.

Referring to FIG. 7, a computing system 1000 may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM 1310 (Read Only Memory) and a RAM 1320 (Random Access Memory).

Thus, the operations of the method or the algorithm described in connection with the embodiments disclosed herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, and a CD-ROM. The exemplary storage medium may be coupled to the processor 1100, and the processor 1100 may read information out of the storage medium and may record information in the storage medium. Alternatively, the storage medium may be integrated with the processor 1100. The processor 1100 and the storage medium may reside in an application specific integrated circuit (ASIC). The ASIC may reside within a user terminal. In another case, the processor 1100 and the storage medium may reside in the user terminal as separate components.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

The device and the method for displaying the distance to empty of the electric vehicle based on the weight according to an embodiment of the present disclosure calculate and display a correct distance to empty by reflecting a state in which the weight of the vehicle is increased due to cargo loading or attachment of a trailer, so that the driver may identify the distance to empty with an improved accuracy even when the weight of the vehicle changes.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. An electric vehicle comprising:
   a battery;
   a detector configured to detect electric vehicle driving status information while the electric vehicle is being driven; and
   a controller configured to:
      calculate a vehicle-driving related electric-efficiency based on an estimated weight, which corresponds to an estimated weight selected from previously stored vehicle-driving related electric-efficiencies;
      correct the selected vehicle-driving related electric-efficiency based on a temperature correction coefficient corresponding to an external temperature;
      estimate a weight of the electric vehicle based on the electric vehicle driving status information;
      determine whether to update a distance to empty based on the corrected selected vehicle-driving related electric-efficiency based on the temperature correction coefficient when the estimated weight is increased or decreased more than a reference value from a preset weight; and
      display a distance to empty calculated based on the preset weight before a weight estimation and an updated distance to empty calculated based on the estimated weight.

2. The electric vehicle of claim 1, wherein an update of the distance to empty includes:
   calculation of a vehicle-driving unrelated electric-efficiency; and
   calculation of the distance to empty based on the calculated vehicle-driving related electric-efficiency and the calculated vehicle-driving unrelated electric-efficiency.

3. The electric vehicle of claim 2, wherein the vehicle-driving related electric-efficiency includes a rate of a vehicle travel distance per unit electric quantity calculated during traveling of the electric vehicle.

4. The electric vehicle of claim 1, wherein the previously stored vehicle-driving related electric-efficiencies include a rate of a vehicle travel distance per unit electricity quantity calculated based on an actually measured weight of the electric vehicle.

5. The electric vehicle of claim 1, wherein the controller is configured to calculate the vehicle-driving related electric-efficiency by reflecting the external temperature to the selected vehicle-driving related electric-efficiency.

6. The electric vehicle of claim 2, wherein the vehicle-driving unrelated electric-efficiency includes a rate of a vehicle travel distance per unit electric quantity calculated based on use of a full automated temperature controller and road information, wherein the road information includes a gradient of a road and a speed limit set on the road.

7. The electric vehicle of claim 1, wherein the controller is configured to guide performance of an update when it is determined to perform the distance to empty update.

8. A method for operating an electric vehicle, the method comprising:
   driving the electric vehicle;
   detecting electric vehicle driving status information while the electric vehicle is being driven;
   calculating a vehicle-driving related electric-efficiency based on an estimated weight, which corresponds to an estimated weight selected from previously stored vehicle-driving related electric-efficiencies;
   correcting the selected vehicle-driving related electric-efficiency based on a temperature correction coefficient corresponding to external temperature;
   estimating a weight of the electric vehicle based on the electric vehicle driving status information;
   determining whether to update a distance to empty based on the corrected selected vehicle-driving related electric-efficiency based on the temperature correction coefficient when the estimated weight is increased or decreased more than a reference value from a preset weight; and
   displaying a distance to empty calculated based on the preset weight before a weight estimation and an updated distance to empty calculated based on the estimated weight.

9. The method of claim 8, further comprising updating the distance to empty, wherein updating the distance to empty includes:
   calculating a vehicle-driving unrelated electric-efficiency; and
   calculating the distance to empty based on the calculated vehicle-driving related electric-efficiency and the calculated vehicle-driving unrelated electric-efficiency.

10. The method of claim 9, wherein the vehicle-driving related electric-efficiency includes a rate of a vehicle travel distance per unit electric quantity calculated during traveling of the electric vehicle.

11. The method of claim 8, wherein the previously stored vehicle-driving related electric-efficiencies include a rate of a vehicle travel distance per unit electricity quantity calculated based on an actually measured weight of the electric vehicle.

12. The method of claim 8, further comprising calculating the vehicle-driving related electric-efficiency by reflecting an external temperature to the selected vehicle-driving related electric-efficiency.

13. The method of claim 9, wherein the vehicle-driving unrelated electric-efficiency includes a rate of a vehicle travel distance per unit electric quantity calculated using a full automated temperature controller and road information.

14. The method of claim 13, wherein the road information includes a gradient of a road and a speed limit set on the road.

15. The method of claim 8, further comprising guiding performance of the update when it is determined to perform the distance to empty update.

16. An electric vehicle comprising:
   a battery;
   a plurality of sensors configured to detect electric vehicle driving status information while the electric vehicle is being driven, the sensors including at least two sensors selected from the group consisting of an accelerator pedal position sensor, a brake pedal position sensor, a pressure sensor, a temperature sensor, a motor rotation speed sensor, an air flow sensor, an intake air temperature sensor, a water temperature sensor, a crank angle sensor, a speed sensor, a tilt sensor, a battery sensor, an acceleration sensor, and a tire sensor, wherein the electric vehicle driving status information comprises at least one of an acceleration, a motor torque, a tire dynamic radius, a vehicle speed, and/or a driving load of the electric vehicle;

an air conditioner operable in response to at least one of the sensors;

a controller configured to:
    calculate a vehicle-driving related electric-efficiency based on an estimated weight, which corresponds to an estimated weight selected from previously stored vehicle-driving related electric-efficiencies;
    correct the selected vehicle-driving related electric-efficiency based on a temperature correction coefficient corresponding to external temperature;
    estimate a weight of the electric vehicle based on the electric vehicle driving status information;
    determine whether to update a distance to empty based on the corrected selected vehicle-driving related electric-efficiency based on the temperature correction coefficient when the estimated weight is increased or decreased more than a reference value from a preset weight; and a display configured to display a distance to empty calculated based on the preset weight before a weight estimation and an updated distance to empty calculated based on the estimated weight.

17. The electric vehicle of claim 16, wherein the previously stored vehicle-driving related electric-efficiencies include a rate of a vehicle travel distance per unit electricity quantity calculated based on an actually measured weight of the electric vehicle.

18. The electric vehicle of claim 16, wherein the controller is configured to calculate the vehicle-driving related electric-efficiency by reflecting an external temperature to the selected vehicle-driving related electric-efficiency.

* * * * *